United States Patent [19]
Stevens

[11] 3,882,452
[45] May 6, 1975

[54] AUTOMATIC CONTROL OF HEADLIGHTS, TAIL LIGHTS, PARKING LIGHTS AND EMERGENCY WARNING FLASHER LIGHTS FOR VEHICLES

[76] Inventor: Walter R. Stevens, 2294-A Pacific Ave., Costa Mesa, Calif. 92627

[22] Filed: July 29, 1974

[21] Appl. No.: 492,420

[52] U.S. Cl. ............... 340/60; 340/52 F; 340/81 F; 315/77
[51] Int. Cl. ............................................ B60q 1/26
[58] Field of Search ........ 340/52 R, 52 D, 52 F, 60, 340/74, 81 R, 81 F; 315/77, 78, 79, 80, 82, 83; 180/103

[56] References Cited
UNITED STATES PATENTS
3,699,514   10/1972   Stevens .................................. 340/60

*Primary Examiner*—Alvin H. Waring
*Attorney, Agent, or Firm*—Warren F. B. Lindsley

[57] ABSTRACT

An improved switching device and circuit for automatically controlling the headlights, tail lights, parking lights and energizing the flashing warning lights of a vehicle in the event of stalling engine, the device functioning to sense oil pressure and engine vacuum.

8 Claims, 7 Drawing Figures

PATENTED MAY 6 1975 3,882,452

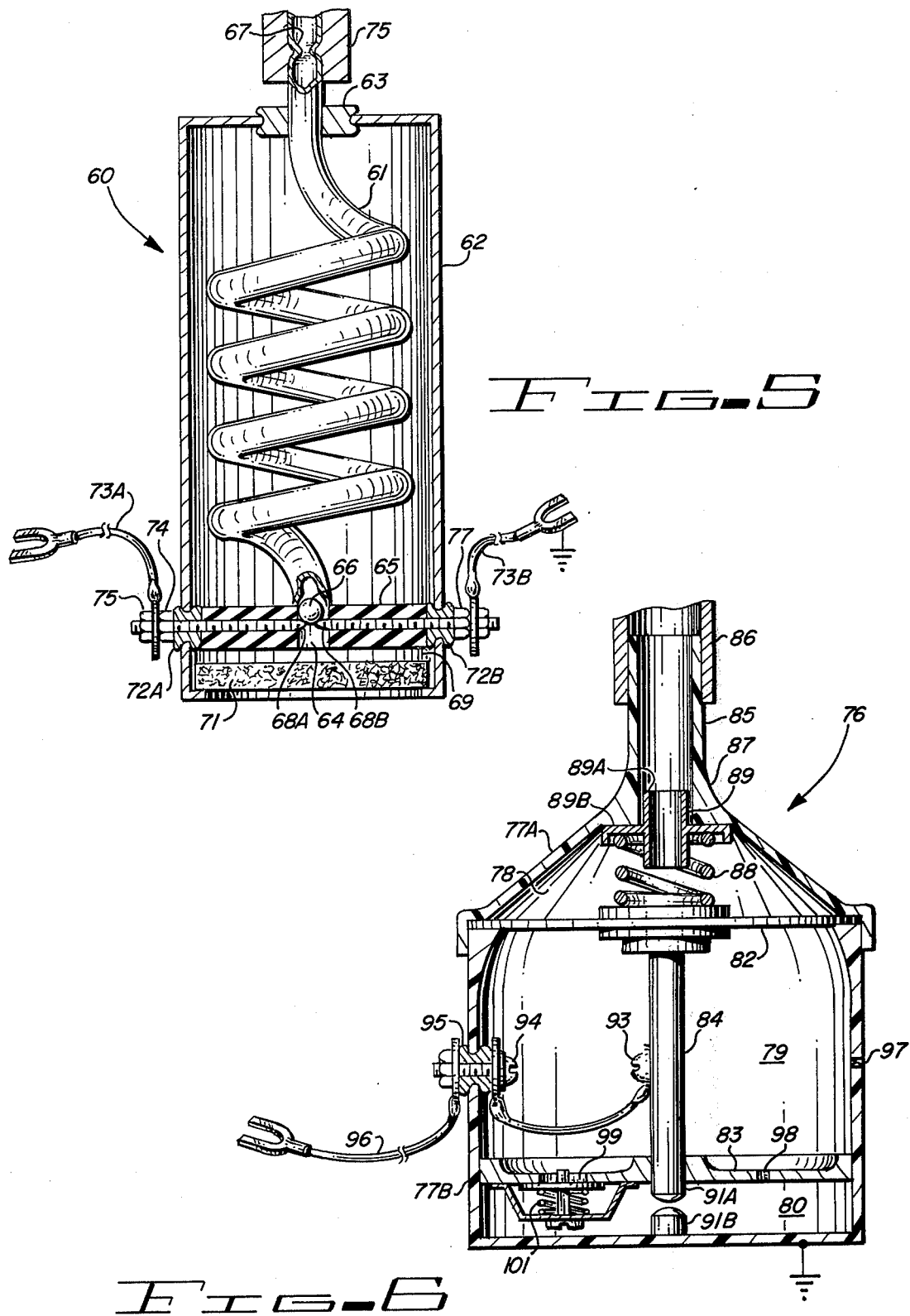

AUTOMATIC CONTROL OF HEADLIGHTS, TAIL LIGHTS, PARKING LIGHTS AND EMERGENCY WARNING FLASHER LIGHTS FOR VEHICLES

BACKGROUND OF THE INVENTION

In recent years there is a growing awareness of the importance of personal safety. This is especially true in connection with the safety of those traveling on our public highways where the safety of each individual is dependent in part upon the precautions taken by others.

Highway safety is controlled in part by the driver and in part by the vehicle. Because the driver cannot always be counted upon to exercise his responsibilities effectively under conditions of fatigue or distraction, the highest level of safety is always achieved through the incorporation of mechanical and automatic safety features in the vehicle itself. One such automatic safety feature is the primary objective of this invention.

Heretofore there was no assurance that the operator of a motor vehicle would turn on the warning flasher lights should his car become stalled or disabled. Personal injury to the driver might well make such action impossible. The installation of an automatic device to accomplish this function will be an aid to the safety of the occupants of the disabled vehicle as well as to those of other vehicles approaching from the front or rear who might not otherwise recognize that the vehicle was stalled or disabled on the roadway.

U.S. Pat. No. 3,699,514 discloses a switch activated by engine oil pressure. Although this earlier invention effectively accomplished the intended purpose under normal circumstances it has the limitation that when the engine is cold the operation of the switch is sluggish or not as responsive as might be desired. Furthermore, in the arrangement described in U.S. Pat. No. 3,699,514, there was the limitation that when the engine stalled the headlights and tail lights were extinguished leaving only the flasher warning lights energized. This could constitute a safety hazard under certain conditions as, for example, in the event the vehicle should stall or stop rotating for any reason while the vehicle is rounding a curve during darkness. Yet another limitation of the previous arrangement was that only the headlights and the tail lights were automatically energized, and then only after the engine had started. A more desirable mode of operation would have the headlights and the tail lights or the parking lights energized when the ignition key is turned. These limitations are overcome by the present invention through the provision of an improved automatic switch functioning on vacuum and pressure principles.

SUMMARY OF THE INVENTION

It is, therefore, one object of this invention to provide an automatic means for energizing the warning flasher lights of a motor vehicle in the event of the disabling of the vehicle with a stalled engine.

Another object of this invention is to provide an improved engine oil operated automatic switch for flasher lights which is not adversely affected by low oil temperatures.

A further object of this invention is to provide an improved automatic flasher light switch responsive to the oil pressure or vacuum lines of the vehicle.

A still further object of this invention is to provide an improved engine oil operated switch for flasher lights employing a time-delay feature which prevents the switch from responding undesirably to momentary pressure fluctuations.

A still further object of this invention is to provide in the wiring of the switch and associated components a feature which causes all the lights of the vehicle to be extinguished when the ignition switch is turned off.

A still further object of this invention is to provide such an improved automatic control circuit which causes the headlights and tail lights as well as the emergency flasher warning lights to remain energized in the event the engine stalls or stops rotating for any reason.

A still further object of this invention is to provide such an improved automatic control circuit which causes the headlights and tail lights or the parking lights as desired and previously set to be energized automatically upon the closing of the ignition switch without dependence upon the starting or rotation of the engine.

Other objects and advantages of this invention will become apparent as the description proceeds and the features of novelty will be pointed out with particularity in the claims annexed to and forming a part of this specification.

BRIEF DESCRIPTION OF THE DRAWINGS

FIG. 5 illustrates a further modification of the switch shown in FIGS. 1 and 2 actuated by pressure changes in the vacuum control lines of the vehicle employing a special time-delay feature.

FIG. 6 illustrates a still further modification of the switch shown in FIGS. 1, 2 and 5.

DESCRIPTION OF THE PREFERRED EMBODIMENT

Figure 1:
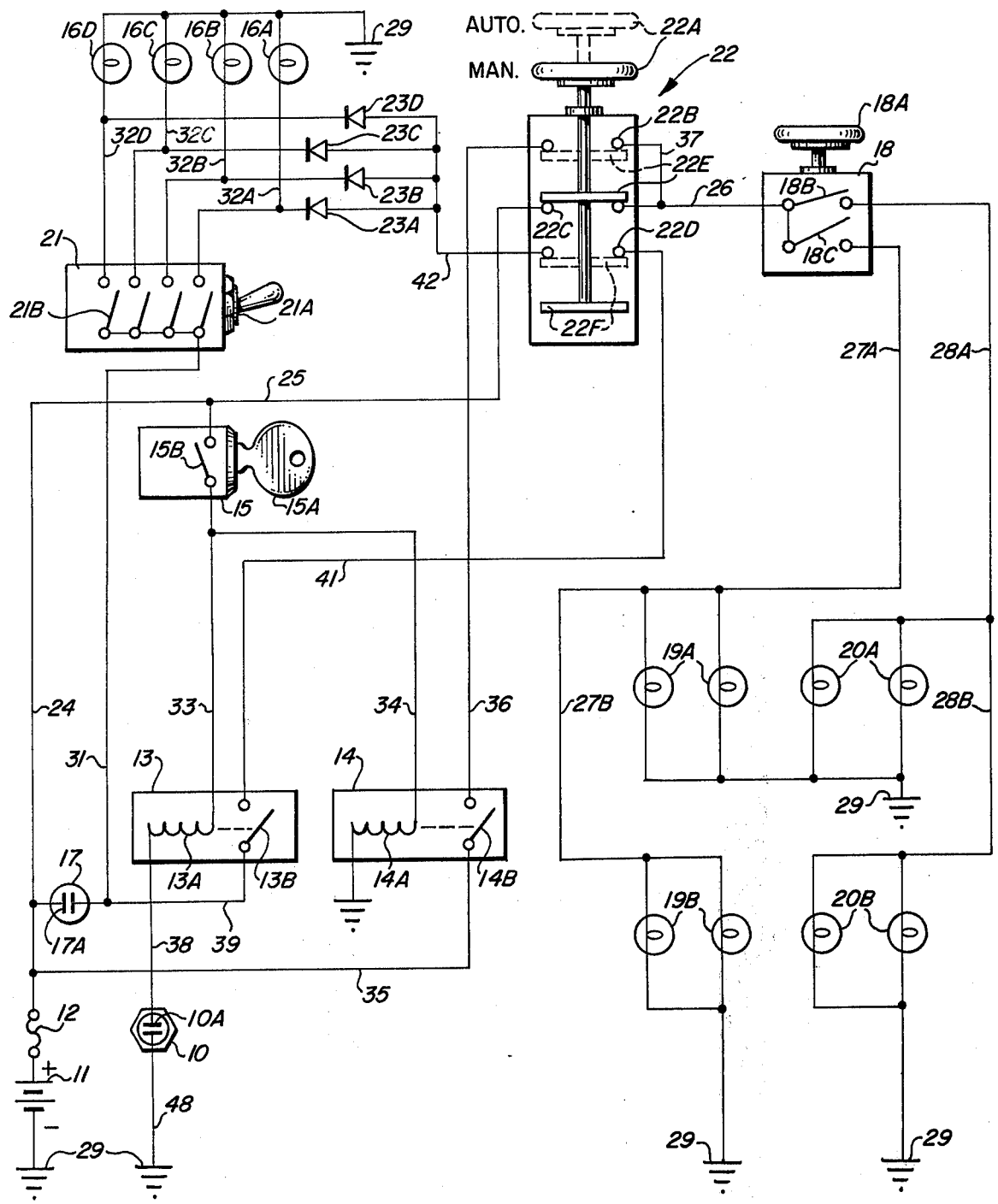
FIG. 1 is a wiring diagram of a typical motor vehicle electrical system incorporating automatic control of headlights, tail lights and parking lights and an automatic switch for the operation of its warning flasher lights in the event of a stalled engine disabling the vehicle.

FIG. 1 illustrates a wiring diagram of one embodiment of this invention wherein automatic control of headlights, tail lights and parking lights and an automatic warning switch 10 is incorporated in the electrical system of a motor vehicle. The electrical system comprises a number of standard or factory installed components including a battery 11, fuse 12, d-c relays 13 and 14, ignition switch 15, flasher warning lights 16A–16D, flasher relay 17, manual light switch 18, headlights 19A, tail lights 19B, front and rear parking lights 20A and 20B, manual flasher switch 21, and the special components related to and incorporated as co-operative elements of this invention including in addition to switch 10 the automatic/manual control switch 22 and the rectifier diodes 23A–23D.

The automatic/manual control switch 22 is operated by means of a push-button 22A which moves two shorting bars 22E and 22F between two positions to short either across contacts 22C or across contacts 22B and across contacts 22D. In the manual position of switch 22 as shown by the solid line representation of button 22A and bars 22E and 22F, bar 22E shorts or closes contacts 22C while in the automatic position as shown by the broken line representation bar 22E closes contacts 22B and bar 22F closes contact 22D.

In the manual (MAN) position of switch 22, the positive terminal of battery 11 is connected via fuse 12, lines 24 and 25, contacts 22C and bar 22E of switch 22, line 26, contacts 18B and 18C of switch 18 and lines 27A and 27B to headlights 19A, tail lights 19B and to front and rear parking lights 20A and 20B, respectively. Switch 18 is the typical factory-installed on/off manual light switch in which upper contacts 18B close first as the button 18A is depressed to close the circuit to parking lights 20A and 20B and with lower contacts 18C closing for the fully depressed position of button 18A to close the circuit to headlights 19A and tail lights 19B. When contacts 18C of switch 18 are closed by means of push-button 18A the headlights and tail lights are energized by a current flowing from the positive terminal of battery 11 through fuse 12, lines 24 and 25, contacts 22C, lines 26, contacts 18C, line 27A and 27B, headlights and tail lights, 19A and 19B, ground connections 29 and back to the negative terminal of battery 11. When contacts 18B are closed the parking lights 20A, 20B are similarly energized via lines 28A and 28B.

Also, with control switch 22 in the manual position (MAN) the flasher lights may be operated by means of manual flasher switch 21. For such manual operation, contacts 21B are closed by means of toggle lever 21A whereupon flasher lights 16A–16D are energized by a current flowing from the positive terminal of battery 11 through fuse 12, flasher relay 17, line 31, contacts 21B, lines 32A–32D, and ground 29 to the negative terminal of battery 11. The flashing on and off of lights 16A–16D is effected by the automatic opening and closing of the series contacts 17A of flasher relay 17.

It will be noted that when control switch 22 is in the manual position, the headlights and tail lights 19A, 19B, parking lights 20A, 20B and warning lights 16A–16D may be operated independently of the position of ignition switch 15.

For automatic control of the headlights, tail lights, parking lights and emergency warning flasher lights, control switch 22 is set in the AUTO position as indicated by the broken line representation of push-button 22A and bars 22E and 22F. In this position bar 22E makes contact across terminals 22B and bar 22F makes contact across terminals 22D.

Now, when contacts 15B of ignition switch 15 are open there is no connection between the positive terminal of battery 11 and coils 13A and 14A of relays 13 and 14. Furthermore, because contacts 22C are open there is no connection from battery 11 to light switch 18 and it is therefore not possible to energize the headlights 19A, tail lights 19B or front and rear parking lights 20A and 20B.

If contacts 15B of ignition switch 15 are now closed by operation of the ignition key 15A, connection is made from the positive terminal of battery 11 through fuse 12, line 24 and contacts 15B to lines 33 and 34. By virtue of its connection between line 34 and ground 29, coil 14A of relay 14 is thus energized and contacts 14B are closed. Connection is therefore made from the positive terminal of battery 11 through fuse 12, line 35, contacts 14B of relay 14, line 36, contacts 22B (now closed by bar 22E), line 37 and line 26 to contacts 18B and 18C of light switch 18. The manual closing of switch 18 now effects the energization of headlights 19A and tail lights 19B or parking lights 20A and 20B, which is automatic with the closing of ignition switch 15. Once energized by the closing of the ignition switch in this manner, the headlights and tail lights or the parking lights will remain energized as long as the ignition switch remains closed even though the engine might stop running.

Again, with switch 22 in the AUTO position and with ignition switch 15 closed, connection is made between the positive terminal of battery 11 to line 33 and coil 13A of relay 13. For coil 13A to be energized, however, the circuit to ground must be completed through line 38 and contacts 10A of automatic warning switch 10. This occurs when contacts 10A are closed in response to the stalling of the vehicle, and contacts 13B are closed. An electrical circuit is now completed beginning at the positive terminal of battery 11 and continuing through fuse 12, flasher relay 17A, line 39, contacts 13B, line 41, contacts 22D of switch 22, line 42, diodes 23A–23D and lines 32A–32D to flasher lamps 16A–16D, ground connections 29 and back to the negative terminal of battery 11. The opening and closing of contacts 17A of flasher relay 17 now effects the intermittent or flashing operation of lamps 16A–16D.

The diodes, 23A–23D, pass current to the lamps 16A–16D via the path just described, but they isolate the individual lamps 16A–16D from each other so that they may be individually controlled through lines 32A–32D by turn-signal controls not shown in FIG. 1. It will also be recognized that lamps 16A–16D may still be energized by means of manual switch 21 regardless of the position (open or closed) of switch 15 and automatic control switch 22.

Figure 2:
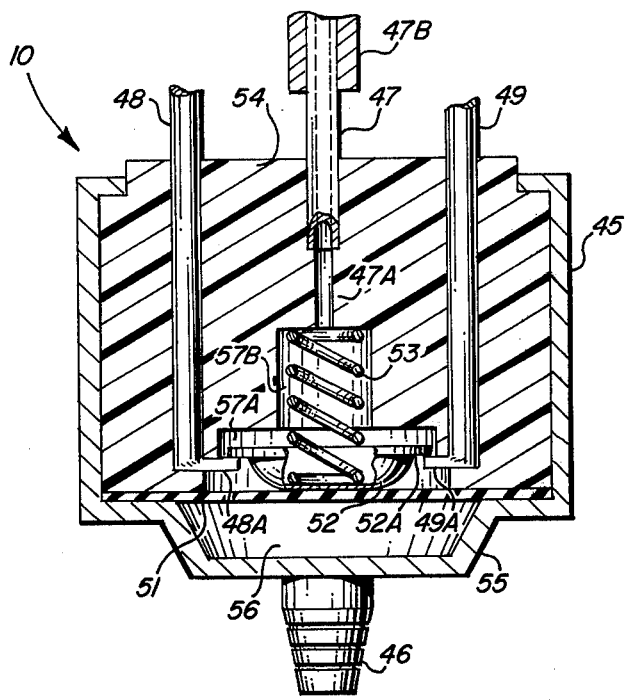
FIG. 2 is a cross-sectional view of one embodiment of an automatic pressure vacuum switch for use in this invention.
Figure 3A:
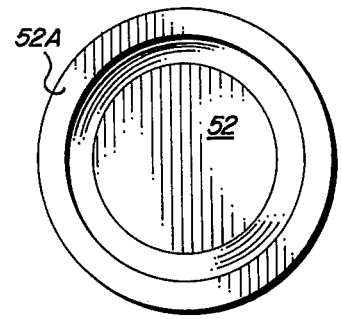
FIGS. 3A and 3B show top and side views of the special diaphragm used as a part of the switch shown in FIG. 2.
Figure 3B:
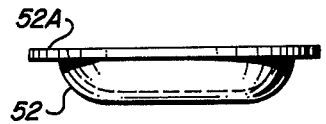
Figure 4:
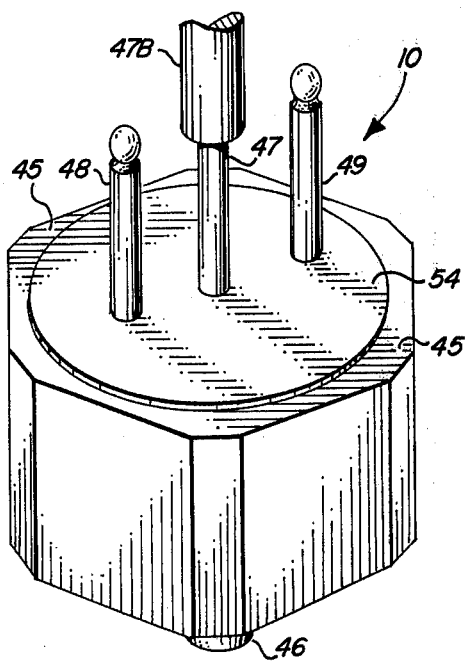
FIG. 4 is a perspective view of the switch shown in FIG. 2.

FIGS. 2-4 show the automatic warning switch 10 in a first embodiment, the switch 10 comprising an outer housing 45, a pipe connection thread 46, a vacuum port 47, contact columns 48 and 49, a pressure/vacuum diaphragm 51, a contact disc 52, a compression spring 53 and a molded plastic inner housing 54.

The outer housing 45 is generally cylindrical but its outer surfaces are faced to form six sides hexagonally oriented similarly to the six faces of a hex nut. The lower end of outer housing 45 has a bell-shaped closure 55 which opens into the pipe fitting 46.

Diaphragm 51 is circular in shape and is made of a flexible yet relatively firm material. Its circumferential edge is supported by the rim of closure 55 so as to form in cooperation with closure 55 a cavity 56 which opens into fitting 46. Diaphragm 51 is held firmly in place over cavity 56 by molded inner housing 54 which effectively seals off cavity 56 from any part of switch 10 above diaphragm 51.

Directly above diaphragm 51 and centrally aligned within housings 45 and 54 is a cavity comprising a lower chamber 57A and an adjoining upper chamber 57B. Both chambers are cylindrical in configuration. Lower chamber 57A has a relatively large diameter approximately equal to half the diameter of housing 45 while upper chamber 57B has a considerably smaller diameter appropriate to house compression spring 53.

Contact columns 48 and 49 are cast into inner housing 54 and are vertically supported thereby near opposite sides of housing 45. At the base of each of the columns 48 and 49, a contact foot extends inward into lower chamber 57A. The foot at the base of column 48 is designated 48A and the foot at the base of column 49 is designated 49A.

Contact disc 52, as shown in FIGS. 2 and 3, comprises an electrically conductive dish-shaped configuration having a flat rim 52A and is housed within chamber 57A. The bottom of the disc rests on diaphragm 51 with the underside of rim 52A resting on top of feet 48A and 49A of columns 48 and 49. Compression spring 53 which is contained within chamber 57B holds disc 52 against diaphragm 51.

Vacuum port 47 comprises a hollow cylindrical tube cast into inner housing 54 and held vertically thereby at the axial center of housing 45. A hollow cylindrical channel 47A leads from the top center of chamber 57B into the open end of port 47.

Switch 10 is connected for use in the electrical system of FIG. 1 by connecting contact column 48 to ground 29 and contact column 49 to coil 13A of relay 13. Port 47 is coupled to the vacuum lines of the vehicle by means of tubing 47B and pipe fitting 46 couples cavity 56 to the crankcase of the vehicle.

When the engine of the vehicle is not running there is no vacuum present within port 47 or within chambers 57A and 57B, and consequently there is no oil pressure above atmospheric pressure within cavity 56. Accordingly, spring 53 holds disc 52 against contact feet 48A and 49A. Disc 52 thus makes electrical contact between columns 48 and 49 and switch 10 is closed.

If the engine is running, however, both the action of the vacuum introduced through port 47 to chambers 57A and 57B lying above diaphragm 51 and the oil pressure build-up inside cavity 56 forces diaphragm 51 and disc 52 upwardly until contact is broken between disc 52 and feet 48A and 49A thus causing electrical contact to be broken between columns 48 and 49. Switch 10 is now open.

When the engine stalls switch 10 is automatically closed by the loss of vacuum and oil pressure within switch 10. In the prior art version described in U.S. Pat. No. 3,699,514 a similar switch was responsive to oil pressure only.

In the prior art switch the high viscosity of the oil when the engine was cold tended to interfere with the reliable operation of the switch. In the switch of FIGS. 2–4, the additional control afforded by the vacuum line effectively overcomes this difficulty.

An alternate version of switch 10 shown in FIG. 5 and comprises a delayed-action vacuum switch 60 embodying a spiral tubular ramp 61 mounted inside a housing 62, the upper end of ramp 61 emerging through a grommet seal 63 located in the top of housing 62 and the lower end of ramp 61 terminating in a central opening 64 of an insulative support 65 located near the lower end of housing 62. A silver plated spherical ball 66 is trapped within ramp 61 by virtue of a restriction 67 in the tubular wall of ramp 61 near its upper end and by a pair of contact points 68A and 68B encased in support 65 at its lower end. These contact points project into the hollow interior of ramp 61 at opening 64 in support 65 from opposite sides of the switch. A cavity 69 is formed in housing 62 immediately below support 65 opening to the atmosphere through a removable air filter 71.

Housing 62 is cylindrical in configuration with disc-shaped support 65 spanning the interior of housing 62 at one end thereof. The opening 64 in support 65 is circular in form and of the approximate diameter of the interior of tubular ramp 61.

Contact points 68A and 68B pass outwardly through support 65 and through insulative grommets 72A and 72B positioned in the walls of housing 62 as shown. Lead wires 73A and 73B are attached respectively to the externally protruding threaded ends of contact points 68A and 68B by means of nuts 74 and 75.

In the operation of vertically mounted switch 60 the upper end of ramp 61 is connected to the vacuum line of the engine of an automobile or other vehicle by means of a flexible tube 75. When the engine is running and a vacuum is present in the vacuum line, ball 65 will be driven to the upper end of ramp 61 by air pressure entering through filter 71 and opening 64 where ball 66 is restrained by restriction 67. By virtue of the sealing action of ball 64 nested against restriction 67, further loss of vacuum is effectively prevented.

If vacuum is now lost in the engine vacuum system by virtue of the stalling of the engine, the ball will begin to fall downwardly from restriction 67 following the spiral path of ramp 61 and arriving at a significantly later time at the bottom of ramp 61 where it is stopped by contact points 68A and 68B. The conductive surface of ball 66 spanning points 68A and 68B makes electrical contact therebetween.

It is readily recognized that switch 60 may be substituted in FIG. 1 for switch 10 with wire 73B connected to ground 29 and with wire 73A connected to coil 13A of relay 13.

Thus switch 60 requires a less expensive installation than switch 10 because it need only to be connected to the vacuum line of the engine. The time-delay introduced into switch 60 involving the significant time required for ball 66 to traverse the length of ramp 61 from top to bottom prevents the erratic closure of switch 60 in response to momentary pressure drops and permits the switch 60 to operate satisfactorily under such conditions.

Another alternate version of switch 10 is the time-delay vacuum switch 76 shown in FIG. 6. Switch 76 is contained within a two-part housing 77A, 77B which is divided internally into an upper cavity 78, an intermediate cavity 79 and a lower cavity 80.

The upper cavity 78 is separated from the intermediate cavity 79 by a first flexible disc 82 and the intermediate cavity 79 is separated from the lower cavity 80 by a second movable disc 83. Discs 82 and 83 are electrically insulative. The center of disc 82 is rigidly coupled to the center of disc 83 by an electrically conductive column 84 which causes a displacement of one of the discs to be accompanied by a like displacement of the other.

The two-part housing 77A, 77B includes a cylindrical lower housing 77B and a bell-shaped upper housing 77A forming a cap over housing 77B and which tapers upwardly into a hose fitting 85 for coupling to a vacuum line 86.

Interposed between the center top surface of disc 82 and the neck 87 of housing 77A is a compression spring 88 which is secured within neck 87 by an insulative collar 89. Collar 89 comprises a vertical hollow cylinder 89A surrounded by a horizontal disc 89B which is joined to cylinder 89A midway between the top and bottom of cylinder 89A. The lower end of cylinder 89A fits inside spring 88 and the upper end of cylinder 89A fits inside neck 87. The outer edge of disc 89B folds downwardly about the outer edge of spring 88. The central position of spring 88 directly below neck 87 and over the center of disc 82 is thus assured by virtue of the design and placement of collar 89.

Column 84 is rigidly attached to the center of disc 83 and extends through disc 83 forming a first contact point 91A which cooperates in an electrical switching action with a second contact point 91B mounted at the center of the bottom wall of housing 77B. Thus, when the centers of discs 82 and 83 are displaced downwardly, point 91A makes electrical contact with point 91B. Since discs 82 and 83 are electrically insulative and because of the electrical isolation afforded between case 77A and spring 88 by collar 89, electrical continuity between column 84 and case 77B is through points 91A and 91B.

The ground connection of switch 76 is made to case 77B while an electrical connection is brought out from column 84 by means of an internal wire 92 attached at one end by means of a screw 93 to column 84 and at the other end to a screw 94 which passes via an insulative grommet 95 through the wall of housing 77B and makes connection to an external hookup wire 96.

A small hole 97 in the wall of housing 77B allows air pressure equalization between intermediate cavity 79 and outside air. A second small hole 98 in disc 83 similarly allows slow pressure equalization between cavities 79 and 80. A third and larger hole 99 blocked by a spring-actuated one-way valve 101 allows relatively rapid flow of air from cavity 79 into cavity 80 but prevents air flow from cavity 80 into cavity 79 via hole 99.

By virtue of the action of valve 101 in cooperation with the restricted air flow path afforded by hole 98 it is seen that the pressure inside cavity 80 acts to dampen the closing action of the switch. Thus, as column 84 exerts a downward force against disc 83 a resisting pressure increase is experienced within cavity 80 which can be relieved only by the slow and restricted air flow upward through hole 98.

In the operation of switch 76, the presence of a vacuum in line 86 and hence within upper cavity 78 causes disc 82 and hence disc 83 to be displaced upwardly so that contact points 91A and 91B are open. If there is a short term pressure fluctuation in the vacuum line, discs 82 and 83 are prevented from being displaced downwardly a sufficient amount to close points 91A and 91B in the limited time available by virtue of the damping action of lower cavity 80 as described above. If a vacuum loss of sufficient duration occurs, however, spring 88 drives discs 82 and 83 downwardly as air is bled out of chamber 80 through hole 98 until points 91A and 91B are closed.

When the engine is started it is desirable that points 91A and 91B open immediately so that the warning lights will not operate. Because valve 101 allows the rapid flow of air into cavity 80 the upward motion of disc 83 is undamped and the rapid opening of points 91A and 91B is thus permitted.

Switch 76 is intended to be connected in place of switch 10 in the circuit of FIG. 1 with case 77B connected to ground and with wire 96 connected to coil 13A of relay 13 and constitutes an alternate arrangement which may prove superior in performance or less costly to produce than switches 10 and 60.

An improved automatic control system has thus been provided which is more economical to produce than previous systems and which effectively overcomes the limitations of the prior art.

A number of variations of the proposed control system may be produced as marketable control packages including, for example, a first package which controls headlights, parking lights and warning flasher lights, a second which controls headlights, parking lights and tail lights, and a third which controls only the warning flasher device.

Although but a few embodiments of the present invention have been illustrated and described, it will be apparent to those skilled in the art that various changes and modifications may be made therein without departing from the spirit of the invention or from the scope of the appended claims.

What is claimed is:

1. An automatic light switching system for vehicles employing an automobile battery, headlights, tail lights and flasher lights and employing:
   a manually operated light switch for connecting said headlights and said tail lights across said battery for controlled energization thereof,
   an ignition switch having first and second terminals, said first terminals being connected to said battery, and
   a warning flasher light switch having first and second terminals, said first terminal of said flasher light switch being connected to said battery and said second terminal of said flasher light switch being connected to said flasher lights, the improvement comprising:
   an automatic warning switch,
   said warning switch comprising a pair of contacts mounted within a housing defining a cavity and interconnected in one position by a bridging contact member,
   a diaphragm positioned within said cavity housing for dividing it into two chambers,
   means for connecting one portion of said cavity to an oil line of the vehicle engine and the other cavity to a vacuum line of the engine,
   whereby the loss of vacuum and oil pressure closes the switching means and running of the engine generates oil pressure and vacuum thereby opening said switching means,
   one terminal of said warning switch being connected to ground and the other terminal being connected to relay means,
   relay means comprising a solenoid coil and a pair of switching contacts,
   one terminal of said coil being connected to said other terminal of said warning switch and the other terminal of said coil being connected to the other terminal of said ignition switch,
   one contact of said relay means being connected to said battery and the other contact being connected to said flasher lights,
   whereby when said ignition switch is closed and said oil pressure and vacuum is low indicating engine stalling or stopping said warning switch is closed, said switching contacts are closed and said flasher lights are energized.

2. The automatic light switching system set forth in claim 1 wherein:
   said warning switch comprises a spring for normally biasing said switch contacts to their open position.

3. The automatic light switching system set forth in claim 1 in further combination with:
   time-delay means for controlling the movement of said contacts of said warning switch.

4. An automatic light switching system for vehicles employing an automobile battery, headlights, parking lights, tail lights and flasher lights and employing:
   a manually operated light switch for connecting said headlights, parking lights and said tail lights across said battery for controlled energization thereof,
   an ignition switch having first and second terminals, said first terminals being connected to said battery, and
   a warning flasher light switch having first and second terminals, said first terminal of said flasher light switch being connected to said battery and said second terminal of said flasher light switch being connected to said flasher lights, the improvement comprising:
   an automatic warning switch,
   said warning switch comprising a pair of contacts mounted within a housing defining a cavity and interconnected in one position by a bridging contact member,
   a diaphragm positioned within said cavity housing for dividing it into two chambers,
   means for connecting one portion of said cavity to a vacuum line of the engine,
   whereby the loss of vacuum closes the switching means and running of the engine generates a vacuum thereby opening said switching means,
   one terminal of said warning switch being connected to ground and the other terminal being connected to relay means,
   relay means comprising a solenoid coil and a pair of switching contacts,
   one terminal of said coil being connected to said other terminal of said warning switch and the other terminal of said coil being connected to the other terminal of switching means,
   one contact of said relay means being connected to said battery and the other contact being connected to said flasher lights,
   whereby when said ignition switch is closed and vacuum is low indicating engine stalling or stopping said warning switch is closed, said switching contacts are closed and said flasher lights are energized and said headlights or parking lights and said tail lights remaining operable if said light switch is closed.

5. The automatic light switching system set forth in claim 1 in further combination with:
   time-delay means for controlling the movement of said contacts of said warning switch.

6. The automatic light switching system set forth in claim 5 wherein:
   said bridging contact comprises a metallic ball, and
   said time-delay means comprises a ramp forming a path for movement of said ball,
   whereby a loss of vacuum causes said ball to close said pair of contacts and a vacuum causes said ball to move along said ramp thereby opening said contact.

7. The automatic light switching system set forth in claim 6 wherein:
   said length of said ramp provides the time-delay function of said warning switch.

8. The automatic light switching system set forth in claim 6 wherein:
   said ramp is formed in a spiral configuration.

* * * * *